(12) United States Patent
Ooms et al.

(10) Patent No.: US 6,347,090 B1
(45) Date of Patent: Feb. 12, 2002

(54) METHOD TO FORWARD A MULTICAST PACKET, AN INGRESS NODE AND A ROUTER REALIZING SUCH A METHOD AND AN INTERNET NETWORK INCLUDING SUCH AN INGRESS NODE AND SUCH A ROUTER

(75) Inventors: Dirk Ooms, Antwerp; Wim Livens, Reet, both of (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/348,574

(22) Filed: Jul. 7, 1999

(30) Foreign Application Priority Data

Jun. 24, 1999 (EP) .............................................. 99401582

(51) Int. Cl.[7] .............................................. H04L 12/54
(52) U.S. Cl. ....................................... 370/428; 370/392
(58) Field of Search ......................... 370/428, 408–410, 370/355, 254, 347, 395, 466, 235, 401, 255; 713/201

(56) References Cited

U.S. PATENT DOCUMENTS

| | | | | |
|---|---|---|---|---|
| 5,265,092 A | * | 11/1993 | Soloway et al. | 370/238 |
| 5,517,494 A | * | 5/1996 | Green | 370/408 |
| 5,734,825 A | * | 3/1998 | Lauck et al. | 370/231 |
| 5,903,559 A | * | 5/1999 | Acharya et al. | 370/335 |
| 5,917,820 A | * | 6/1999 | Rekhter | 370/401 |
| 5,964,841 A | * | 10/1999 | Rekhter | 370/255 |
| 6,084,855 A | * | 7/2000 | Soirinsuo et al. | 370/235 |

FOREIGN PATENT DOCUMENTS

| | | |
|---|---|---|
| EP | 0 598 969 A1 | 6/1994 |
| EP | 0 637 149 A2 | 2/1995 |

OTHER PUBLICATIONS

S. Deering et al, "Multicast Routing in Datagram Internetworks and Extended Lans", ACM Transactions on Computer Systems, US., Association for Computing Machinery, New York, vol. 8, Nr. 2, pp. 85–110 XP000137193.

Lorenzo Aguilar, "datagram routing for internet multicasting", Computer Communication Review, vol. 14, No. 2, Jul. 6–8, 1984, pp. 58–63, XP0008569690.

"Datagram Routing for Internet Multicasting" by Lorenzo Aguilar, SRI International, Menlo Park California, published Sigcomm84 Mar. 1984, ACM 0-8791-136-9/84/006/0058 p. 58 to 62.

* cited by examiner

Primary Examiner—Huy D. Vu
Assistant Examiner—Prenell Jones
(74) Attorney, Agent, or Firm—Sughrue Mion, PLLC

(57) ABSTRACT

The invention is a method that forwards a multicast packet in a connectionless multicast system from an ingress node via a router to a plurality of destinations. In the method, a relation between a value of a receiver update notification and a predefined construction set is stored by the router in a memory. The predefined construction set includes a set of next hops that includes one or more next hops being determined according to local unicast routing information for each destination of a predefined set of destinations. The method associates by the ingress node to a starting destination set the value of the receiver update notification and, including by the ingress node, the value of the receiver update notification in the multicast packet. Upon reception of the multicast packet that includes the value of the receiver update notification, the router determines a predefined subset of destinations and determines for the predefined subset of destinations a next hop of the set of next hops according to the value of the receiver update notification and according to the relation to the predefined construction set.

12 Claims, 2 Drawing Sheets

METHOD TO FORWARD A MULTICAST PACKET, AN INGRESS NODE AND A ROUTER REALIZING SUCH A METHOD AND AN INTERNET NETWORK INCLUDING SUCH AN INGRESS NODE AND SUCH A ROUTER

BACKGROUND OF THE INVENTION

The present invention relates to a method to forward a multicast packet in a connectionless multicast system according to claim 1 and to an ingress node and a router realizing such a method according to claim 7 and to claim 8, respectively, and to an internet network including such an ingress node or such a router according to claim 10.

Such a method is already known in the art, e.g. from the Article 'Datagrom Routing for Internet Multicasting' written by Lorenzo Aguilar, SRI International, Menlo Park Calif., and published in the proceedings of *Sigcomm*84 in March 1984, ACM 0-8791-136-9/84/006/0058 page 58 to 62.

Therein a solution to the problem of multidestination routing in internetworks is described. More particular, at page 59, third paragraph, the so called 'multidestination addressing' is described. Such an algorithm places all its destination addresses in an Internet Packet. During propagation, the packet is replicated at gateways, called hereafter routers, and the address list is partitioned among the newly created packets, according their next internet stop. In this way, at each router the next hop for each destination is determined and per next hop a new header is constructed that contains only these destinations for which that next hop is on the shortest path to these destinations. This approach is called in the claims connectionless multicast system.

A problem outstanding with such a connectionless multicast system is however that the forwarding process in the different routers requires, a number of times, the consultation of the unicast routing table whereby this look-up and the re-construction of the packet headers consumes too much processing time. Hereby the wire-speed forwarding can not be achieved.

SUMMARY OF THE INVENTION

An object of the present invention is to provide a method to forward a multicast packet in a connectionless multicast system from an ingress node via a router to a plurality of destinations that does not have the above problem of consuming too much processing for the number of look-ups to the unicast routing table and the re-construction of the packet headers.

According to the present invention this object is achieved with the method of claim 1 which is realized by the ingress node and the router of claim 7 and claim 8, respectively and by the internet network that includes such an ingress node and such a router of claim 10.

Indeed, the object is achieved due to the fact that the method, according to claim 1, comprises the steps:

a) storing by the router in a memory a relation between a value of a receiver update notification and a predefined construction set. The predefined construction set includes a set of next hops that includes one or more next hops. The next hops are determined for each destination of a predefined set of destinations. The next hops are determined according to look-ups to local unicast routing information. The predefined set of destinations e.g. the destinations received within the header of a multicast packet includes only these destinations of the plurality of destinations for which the router is on a path to these destinations.

b) associating by the ingress node to a starting destination set the value of the receiver update notification. Such a starting destination set includes each one of the plurality of destinations. The ingress node furthermore includes this value of the receiver update notification in the multicast packet in order to be forwarded together with the multicast packet; and c) by the router, upon reception of the multicast packet that includes the value of the receiver update notification, determining a predefined subset of destinations; and determining for the predefined subset of destinations a next hop of the set of next hops according to the value of the receiver update notification and according to the relation to the predefined construction set; and including in the multicast packet the predefined subset of destinations and the value of the receiver update number; and forwarding the multicast packet towards the next hop, the predefined subset of destinations includes these destinations of the plurality of destinations for which the next hop is on a path to these destinations.

Indeed, in this way the ingress node puts the value of the receiver update notification in e.g. the destination address and uses this same number for the following multicast packets whereby a router according to the present invention forwards the multicast packets according to the associated construction set in its memory. Each time the set of destinations changes, the ingress node indicates this to the downstream routers by updating and using a new value for the receiver update notification whereby the router is flagged to adapt the construction set by consulting, only then, the unicast routing table.

It has to be remarked here that the use of a value of the receiver update number is not necessary in order to forward a multicast packet. Indeed, once a value has been defined by the ingress node and has been forwarded to the routers, the value might be used to improve the forwarding process of the routers but is not essential to forward the multicast packets towards the different destinations.

A further remark is that as well traditional routers and routers according to the present invention might be used simultaneous in the network. Indeed, in the event of a traditional router that not works with a memory for storing the relations between receiver update notification and construction set, the router is still able to forward the multicast packets according to the prior art connectionless multicast procedures. Such a router just ignores the inclusion of such a receiver update notification in the multicast packet. On the other hand, a router according to the present invention will use the presence of a value for the receiver update notification and is enabled to improve its forwarding process.

Furthermore, it has to be remarked that the expression 'is on a path to these destinations' is used in the application to mention the route from the ingress node to the destinations. Hereby it has to be understood that usual a shortest path is used for the routing of the multicast packets from the ingress node to the destinations. However the use of another predefined path from the ingress node to the different destinations that depends upon other kinds of criteria e.g. delay and bandwidth in order to be determined is not excluded by the present invention.

It has to be remarked that a clear difference arises between a receiver update notification and a multicast group number. Indeed, the receiver update notification is a reference to a construction set that includes information from the unicast routing tables but that is not essential to be used to forward the multicast packets. Whereas a multicast group number is a reference to information in a multicast routing table that is essential to be looked up in order to forward the multicast packets.

A further remark is that it has to be understood that the expression 'including e.g. a subset of destinations or a receiver update number' means that at least a reference to such destination of the subset of destinations or a reference to the receiver update number is included in the internet multicast packet at a predefined appropriate place.

Yet, a remark is that an ingress node is defined as being the first node, for distributing the multicast packets, of a domain of nodes. Such nodes might be routers or hosts whereby an ingress node can be a host or a router.

Furhtermore, it has to be remarked that according to step c) the multicast packet is forwarded towards the next hop. In fact, it is not the multicast packet but a replication i.e. a copy of the payload of the packet and a reconstruction of the header of the packet that is forwarded to the next hop. This is known according to the working of connectionless multicast system, but however, goes beyond the scope of the invention. The aim is that a replicate of the multicast packet is forwarded to the next hops but is recalled, in order not to overload the text, multicast packet.

Yet, it has to be remarked that an implementation with different next hops coupled to one output link of the router is not excluded e.g. an Ethernet link.

A further feature of the present invention is described in claim 2. Herein it is described that in the event of more than one next hop being included in the set of next hops, the predefined construction set further includes a destination relation between each next hop and the predefined subset of destinations. Hereby the step of determining the predefined subset of destinations is realized according to this destination relation. Indeed, since more than one next hop is involved to forward the multicast packet to, the partitioning of the destinations over the different constructed new headers must be determined. This might be realized according to the destination relation.

Furthermore, according to claim 3, in the event of only one next hop being included in the set of next hops, the predefined subset of destinations might be determined by a received set of destinations being included in the received multicast packet. Indeed, since only one next hop is involved to forward the multicast packet to, determination of the newly subset of destinations to be included in the newly reconstructed header is realized by taking over the received set of destinations in the received multicast packet.

Another characteristic feature is described in claim 4. In the event when the value of the receiver update notification and the predefined set of destinations was already included in a previously received multicast packet the set of next hops can be determined according to this set of destinations. The predefined construction set is constructed for each next hop according to unicast routing information and for each next hop a subset of destinations is determined i.e. destination relation. The relation between the value of the receiver update notification and the predefined construction set is established and hereby the step a) of the method of the invention is executed upon reception of this previously received multicast packet.

It has to be remarked here that a previously packet is not necessary the multicast packet that was forwarded just before the actual multicast packet and that is neither the first packet of the multicast session with this set of starting destinations. Indeed, other elements might be important to decide during the connectionless multicast forwarding process the use of the receiver update notification e.g. the actual load of the network or the processing load of the ingress node. The aim is that at a predefined moment a value for the receiver update notification is determined and is associated to a starting set of destinations. From then on, this value might be included, on regular or on rather irregular base, into the multicast packets in order to enable the routers to improve its forwarding process.

Furthermore, claim 5 describes a situation whereby upon reception of a following multicast packet that includes a second value of the receiver update notification and that is associated to another starting destination set e.g. an extended starting destination set, the router has no relation stored in its memory. In this case, the following multicast packet is forwarded according to connectionless multicast procedures and step a) is executed for this second value of the receiver update notification and a second construction set (CS2). This means that the unicast routing table is consulted to construct again a new construction set according to the set of next hops and eventually according to a new subset of destinations. The construction set is saved and referred by the newly received second value of the receiver update notification. The second value of the receiver update notification and the new subsets of destinations are included in the following multicast packet and are routed towards the different hops according to the usual connectionless multicast system.

Finally, it has to be explained that as long that only one ingress node is included in the network to provide the multicast packets, the relation between the receiver update notification and the construction set can be determined unambiguous by reference to the value of the receiver update notification; However, in most networks more than one ingress node is included to provide the service of multicast sessions. In such networks it is clear that the relation to a construction set is identified by a unique combination of a value of the receiver update notification and a network internet address of the ingress node. This is described in claim 6.

It should be noticed that the term "comprising", used in the claims, should not be interpreted as being limitative to the means listed thereafter. Thus, the scope of the expression "a device comprising means A and B" should not be limited to devices consisting only of components A and B. It means that with respect to the present invention, the only relevant components of the device are A and B.

Similarly, it is to be noted that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and in input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

First, the working of the method of the present invention will be explained by means of a functional description of the functional blocks shown in the figures. Based on this description, implementation of the functional blocks will be obvious to a person skilled in the art and will therefor not be described in further detail. In addition, the principle working of the method to forward a multicast packet in a connectionless multicast system will be described.

Figure 1:
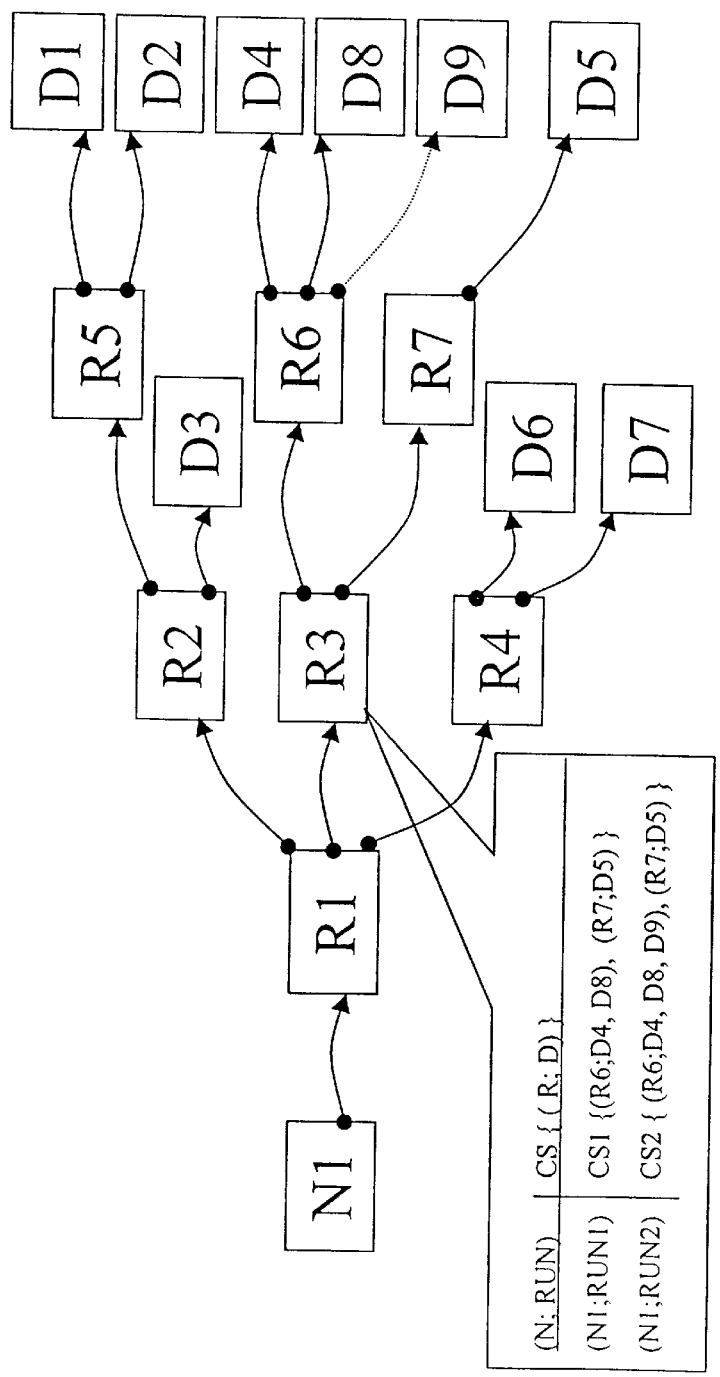
FIG. 1 represents a connectionless multicast system in an internet network and FIG. 2 represents a block diagram of an ingress node coupled to a router according to the present invention.

Referring to FIG. 1, a connectionless multicast system in an internet network is shown. An ingress node N1 is coupled via seven routers R1, R2, R3, R4, R5, R6 and R7 to eight destinations D1, D2, D3, D4, D5, D6, D7 and D8. The eight destinations are members of a multicast session. This means that the ingress node N1 distributes multicast packets to these destinations. In this way a multicast packet is forwarded to e.g. destination D4 via router R1, router R3 and router R6 respectively. More particular, the multicast packet is forwarded by the ingress node N1 and is in each router on its path replicated and further distributed to the different next hops i.e. the next routers on its way towards the set of destinations.

The routing method used by the multicast system is connectionless multicast. This means that an internet packet includes all the internet addresses of the multicast session members i.e. the set of destinations D1, D2, . . . , D8. It has to be remarked that although in the following paragraphs it is mentioned that 'destinations' are included in the header of a packet it has to be understood that the inclusion of the 'Internet addresses of the destinations' is meant. In each router the next hop for each destination is determined and per next hop a new header is constructed. This new header contains only the destinations for which that next hop is on the shortest path to these destinations. In this way e.g. in router R3 a received multicast packet is duplicated and two new headers are constructed. A first new header contains destination D4 and D8 and is forwarded in a first duplicate of the internet packet to the next hop i.e. router R6. The other new header contains only destination D8 and is forwarded in a second duplicate of the internet packet to the next hop i.e. R7.

Figure 2:
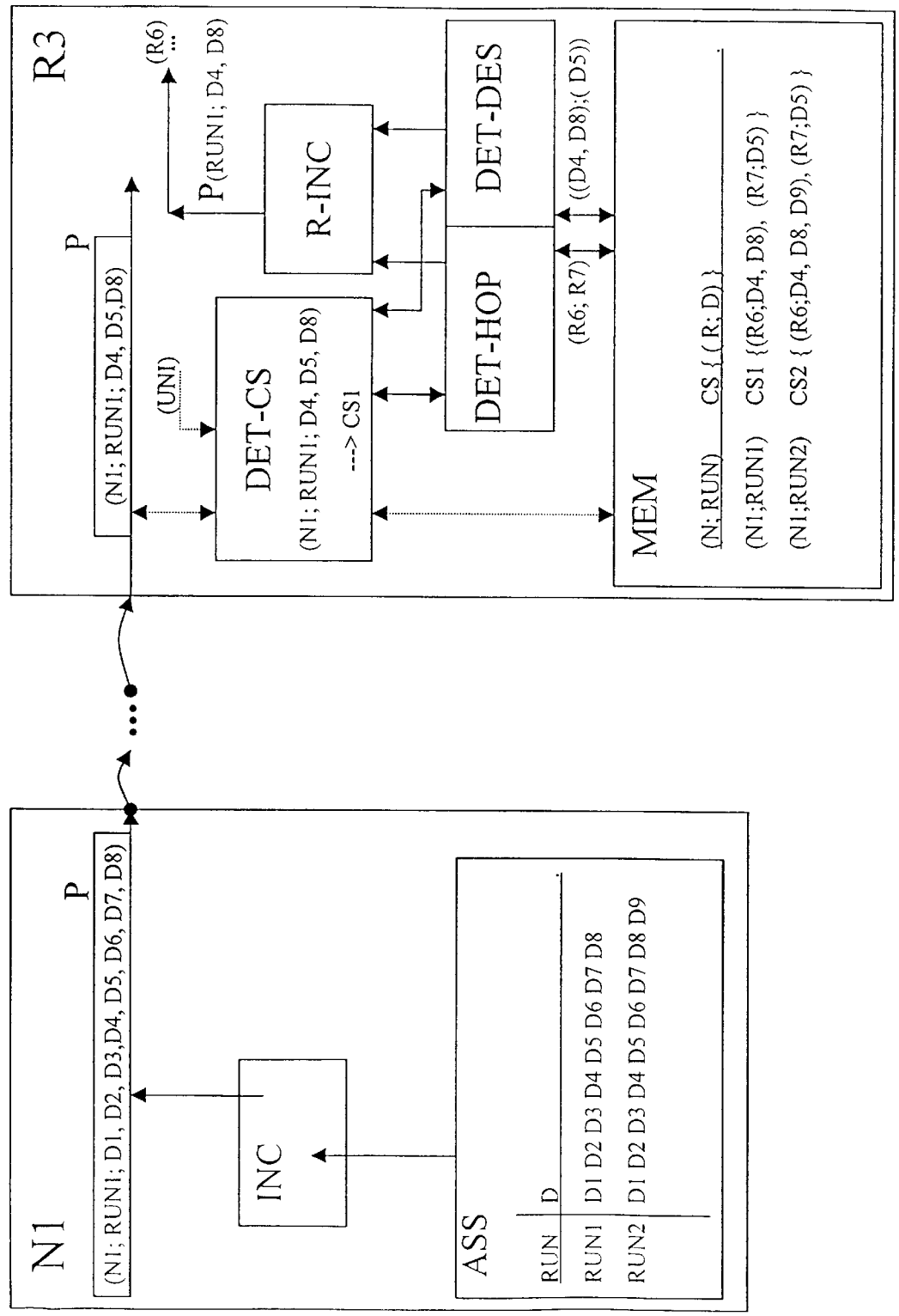

Referring to FIG. 2 a block diagram of the ingress node N1 and the router R3 of the above mentioned connectionless multicast system is shown. As it is known from FIG. 1, the ingress node N1 is coupled via router R1 to router R3. This is not repeated in FIG. 2 in order not to overload the figure.

The ingress node N1 comprises associating means ASS and inclusion means INC coupled thereto. The inclusion means INC is coupled to an output of the ingress node N1.

The associating means ASS is implemented for this particular embodiment by a memory. The associating means ASS associates to a starting destination set e.g. D1, D2, . . . , D8 that includes each one of the members of the multicast session to a first value of a receiver update notification RUN1. The set of destinations D1, D2, . . . , D8 and the first value RUN1 are forwarded by the associating means ASS to the inclusion means INC.

The inclusion means INC includes, according to the connectionless multicast system, each internet address of each destination of the multicast session, called starting destination set, into the header of a present multicast packet P. Furthermore, the inclusion means INC includes, according to the present invention, also the first value of the receiver update notification that is associated to this starting destination set into the header of the present multicast packet P.

It has to be remarked that, in order not to overload FIG. 2, only the header information that is relevant to the present invention is shown as being included in the multicast packet P. The header information that is not relevant to the present invention and the payload of the internet packet P are not shown.

The router R3 comprises a memory MEM, a destination determiner DET-DES, a next hop determiner DET-HOP, a router inclusion means R-INC and a construction set determiner DET-CS.

As already mentioned in a previous paragraph, an internet packet received at an input of router R3 is not the internet packet as distributed by the ingress node N. The header of the received internet packet was re-constructed by router R1 (see FIG. 1). The header of the internet packet that is received by router R3, includes only these destinations for which R3 is on a path to these destinations i.e. D4, D5 and D8. This set of destinations is a predefined set of destinations D4, D5, D8 since they are predefined by the previous router R1.

The construction set determiner DET-CS is coupled to an input of the router R3, to the memory MEM and to the next hop determiner DET-HOP. The next hop determiner DET-HOP is also coupled to the memory MEM and to the router inclusion means R-INC. The destination determiner DET-DES is coupled to the memory MEM and to the router inclusion means R-INC. The router inclusion means R-INC is coupled to an output of the router R3.

According to this particular embodiment, the construction set determiner DET-CS is included to determine a construction set in the event when it is required. Such an event is e.g. when a particular value of the receiver update notification is present in the internet packet but, however, the value can not be found in the memory MEM.

The construction set determiner DET-CS extracts from the received internet packet the included value of the receiver update notification RUN1, the predefined set of destinations e.g. D4, D5 and D8 and the internet address of the ingress node N1.

The construction set determiner DET-CS first checks whether an appropriate construction set e.g. CS1 is available in the memory MEM. This will be explained in a further paragraph.

In the event when no construction set is available, the construction set determiner DET-CS looks up into its unicast routing table in order to determine for each destination of the predefined set of destinations a next hop e.g. for D4, D5 and D8 the next hops R6, R7 and R6 are, respectively, determined.

Furthermore, for each determined next hop R6 and R7 the subset of destinations is listed. The subset of destinations includes these destinations for which the next hop is on a path to these destinations. In this way the construction set determiner DET-CS determines a construction set for the received multicast packet. The construction set e.g. CS1 comprises for each determined next hop e.g. R6 and R7 the determined subset of destinations D4, D8 and D5, respectively.

The construction set CS1 is used in order to construct the new headers for the duplicated received multicast packet P and to forward these packets towards the respectively next hops.

Furthermore, according to the present invention, the construction set CS1 is also stored in the memory of the router R3. The memory MEM stores the forwarded construction set e.g. CS1 of the construction set determiner DET-CS. It has to be remarked that the ingress node N1 is not the only node that provides multicast sessions. In this way the value of the receiver update notification RUN1 might not be sufficient in order to identify the generated construction set CS1 in a unique way. Therefor the combination of the received value of the receiver number notification e.g. RUN1 and the internet address of the ingress node N1 are stored together with the generated construction set CS1. It has to be remarked that according to this embodiment the construction set CS1 also includes a destination relation between each next hop and the determined subset of destinations. This is shown in FIG. 2 by a table included in the memory MEM.

Furthermore, in the event when a multicast packet P is received by the router R3 that comprises a value of the receiver update notification e.g. RUN1 that can be found in the memory MEM no reconstruction of the construction set CS1 is executed. Indeed, according to the unique combination of the internet address of the ingress node N1 with the value of the receiver update number RUN1 the required construction set CS1 is determined in a unique way. Even more, the determined construction set CS1 was constructed in advance and can be used immediately. No looking up in the unicast routing table is required in order to forward this internet packet P. The newly headers can be constructed immediately.

The destination determining means DET-DES determines a subset of destinations according to the destination relation in the memory MEM and forwards this information to the router inclusion means R-INC.

The next hop determining means DET-HOP determines for each determined subset of destinations a next hop and forwards this information to the router inclusion means R-INC.

In this way the router inclusion means R-INC includes for each next hop e.g. R6 in a replicated multicast packet P' a subset of destinations e.g. D4 and D8 and the associated value of the receiver update notification RUN1. The router inclusion means R-INC routes hereafter the packet P' towards an output of the router R3 according to the next hop R6.

The principle working of the method to forward a multicast packet P in a connectionless multicast system from the ingress node N1 via the router R3 to a starting destination set of eight destinations D1, D2, . . . , D8 is described in the following paragraph.

Presume a situation wherein a previous multicast packet was already sent to the starting destination set D1, D2, . . . , D8. According to the present invention was the value of the receiver update notification RUN1 forwarded together with the eight destinations in this previous packet to the starting set of destinations D1, D2, . . . , D8. This means that if this value RUN1 in combination with the internet address of the ingress node N1 was not known by the router R3, it will be known by the time when this previous packet passed the router R3. Herewith, the construction set CS1 is constructed by the router R3 in order to reconstruct the new headers and in order to forward the duplicated packets. Furthermore, this construction set CS1 is also stored in the memory MEM of the router R3.

Now, when the multicast packet P of the same multicast session is forwarded by the ingress node N1 to the same starting destination set D1, D2, . . . , D8 the same value RUN1 of the receiver update notification is included in the internet packet P. Upon reception of the internet packet P by the router R3, the value of the receiver update notification, the internet address of the ingress node N1 i.e. the source address of the internet packet and the predefined destination set D4, D5, D8 are extracted from the header of the multicast packet P by the construction set determiner DET-CS. The construction set determiner DET-CS controls the memory MEM upon the presence of the unique combination of the value of the receiver number notification RUN1 and the internet address of the ingress node N1. Since this combination was already stored together with the associated construction set CS1 at the moment when the previous packet passed the router R3 the combination is found back by the construction set determiner DET-CS. The destination determiner DET-DES and the next hop determiner are using the present information in the memory and forward this to the router inclusion means R-INC. The router inclusion means R-INC includes (RUN1; D4, D8) in a new packet header of a duplicated packet and forwards this packet to the router R6. The router inclusion means R-INC includes (RUN1; D5) in another new packet header of another duplicated packet and forwards this packet to the router R7.

Presume a situation wherein an extra destination D9 is added to the actual multicast session. This means that the starting destination set D1, D2, . . . , D8, D9 is extended i.e. is changed. The ingress node N1 defines a second value RUN2 for the receiver update notification and associates this value to the newly defined starting destination set D1, D2, . . . , D8, D9. The following multicast packet to be forwarded by the ingress node N1 includes now the second value RUN2 of the receiver update notification together with the extended starting destination set D1, D2, . . . , D8, D9. Upon reception of this following multicast packet by the router R3, in a similar way as described in a previous paragraph, the construction set determiner DET-CS checks the memory upon the presence of the combination N1 with RUN2. This time the combination is not found and the construction set determiner DET-CS is obliged to look up into the unicast routing table in order to determine a new construction set. So, in this way the router R3 is warned by the ingress node N1 that a new starting destination set D1, D2, . . . , D8, D9 is used and that most likely the received predefined destination set D4, D5, D8 and D9 is also changed. A new construction set CS2 is determined that includes a difference with the previous construction set CS1 of the extra destination D9 to the destination relation with router R6. This new construction set CS2 is used to forward this actual following multicast packet and is stored in the memory to be used for the next coming multicast packets.

While the principles of the invention have been described above in connection with specific apparatus, it is to be clearly understood that this description is made only by way of example and not as a limitation on the scope of the invention, as defined in the appended claims.

What is claimed is:

1. Method to forward a multicast packet (P) in a connectionless multicast system from an ingress node (N1) via a router (R3) to a plurality of destinations (D1; D2; . . . ; D8), characterized in that said method comprises the steps of
   a) storing by said router (R3) in a memory a relation between a value of a receiver update notification (RUN1) and a predefined construction set (CS1), said predefined construction set (CS1) includes a set of next hops that includes one or more next hops (R6, R7) being determined for each destination of a predefined set of destinations (D4, D5, D8) according to local unicast routing information, said predefined set of destinations (D4, D5, D8) only includes these destinations of said plurality of destinations for which said router (R3) is on a path to these destinations; and
   b) associating by said ingress node (N1) to a starting destination set (D1, D2, . . . , D8) that includes each one of said plurality of destinations (D1, D2, . . . , D8) said value of said receiver update notification (RUN1) and including by said ingress node (N1) said value of said receiver update notification (RUN1) in said multicast packet (P);

c) by said router (R3), upon reception of said multicast packet (P) that includes said value of said receiver update notification (RUN1), determining a predefined subset of destinations (D4, D8); and determining for said predefined subset of destinations (D4, D8) a next hop (R6) of said set of next hops (R6, R7) according to said value of said receiver update notification (RUN1) and according to said relation to said predefined construction set (CS1); and including in said multicast packet (P) said predefined subset of destinations (D4, D8) and said value of said receiver update notification (RUN1); and forwarding said multicast packet (P) towards said next hop, said predefined subset of destinations (D4, D8) includes these destinations of said plurality of destinations for which said next hop (R6) is on a path to these destinations.

2. The method to forward a multicast packet (P) according to claim 1, characterized in that in the event of more than one next hop being included in said set of next hops (R6, R7), said predefined construction set (CS1) further includes a destination relation between said next hop (R6) and said predefined subset of destinations (D4, D8) whereby said step of determining said predefined subset of destinations (D4, D8) being realized by said destination relation.

3. The method to forward a multicast packet (P) according to claim 1, characterized in that in the event of one next hop being included in said set of next hops, said predefined subset of destinations (D4, D8) being determined by a received set of destinations being included in said multicast packet (P) upon reception of said multicast packet (P).

4. The method according to claim 1, characterized in that in the event when said value of said receiver update notification (RUN1) and said predefined set of destinations (D4, D5, D8) was included in a previously received multicast packet, determining said one or more next hops (R6, R7) according to said set of destinations (D4, D5, D8) in order to determine said predefined construction set (CS1) and in order to determine thereby said relation between said value of said receiver update notification (RUN1) and said predefined construction set (CS1) and in order to execute thereby said step a) upon reception of said previously received multicast packet.

5. The method according to claim 1, characterized in that upon reception of a following multicast packet by said router (R3) that includes a second value of said receiver update notification (RUN2) being associated to another starting destination set (D1, D2, . . . , D8, D9) and having no relation stored in said memory of said router (R3), forwarding said following multicast packet according to connectionless multicast procedures and executing said step a) for said second value of said receiver update notification (RUN2) and a predefined second construction set (CS2).

6. The method according to claim 1, characterized in that said relation being identified by a unique combination of a value of said receiver update notification (RUN1) and a network address of said ingress node (N1).

7. An ingress node (N1) to forward in a connectionless multicast system a multicast packet (P) via a router (R3) coupled thereto to a plurality of destinations (D1; D2; . . . ; D8), characterized in that said ingress node (N1) comprises associating means (ASS) to associate a starting destination set (D1, D2, D3, . . . , D8) including each one of said plurality of destinations (D1; D2; D3; . . . ; D8) to a value of a receiver update notification (RUN1); and inclusion means (INC) coupled to said associating means (ASS) to include said value of said receiver update notification (RUN1) in said multicast packet (P) in order to be forwarded therewith and in order to thereby enable said router (R3) to store in a memory a relation between said value of said receiver update notification (RUN1) and a predefined construction set (CS1), said predefined construction set (CS1) including a set of next hops that includes one or more next hops (R6, R7) being determined for each destination of a predefined set of destinations (D4, D5, D8) according to local unicast routing information, said predefined set of destinations (D4, D5, D8) only includes these destinations of said plurality of destinations for which said router (R3) is on a path to these destinations; and in order to enable said router upon reception of said multicast packet (P) that includes said value of receiver update notification (RUN1) to determine a predefined subset of destinations (D4, D8); and to determine for said predefined subset of destinations (D4, D8) a next hop (R6) of said set of next hops (R6, R7) according to said value of said receiver update notification (RUN1) and according to said relation to said predefined construction set (CS1); and to include in said multicast packet (P) said predefined subset of destinations (D4, D8) and said value of said receiver update notification (RUN1); and to forward said multicast packet (P) towards said next hop, said predefined subset of destinations (D4, D8) including these destinations of said plurality of destinations for which said next hop (R6) is on a path to these destinations.

8. A router (R3) to receive and to further forward in a connectionless multicast system a multicast packet received from an ingress node (N1) coupled thereto and forwarded by said ingress node (N1) via said router (R3) to a plurality of destinations (D1; D2; . . . ; D8), characterized in that said router (R3) comprises memory means (MEM) coupled to an input of said router (R3) to store a relation between a value of a receiver update notification (RUN1) and a predefined construction set (CS1), said predefined construction set (CS1) including a set of next hops that includes one or more next hops (R6, R7) being determined for each destination of a predefined set of destinations (D4, D5, D8) according to local unicast routing information, said predefined set of destinations (D4, D5, D8) only including these destinations of said plurality of destinations for which said router (R3) is on a path to these destinations, said value of said receiver update notification (RUN1) being associated by said ingress node (N1) to a starting destination set (D1, D2, . . . , D8) including each one of said plurality of destinations (D1, D2, . . . , D8) and being included by said ingress node (N1) in said multicast packet (P) in order to be forwarded to said plurality of destinations (D1; D2; . . . ; D8); and destination determining means (DET-DES) to determine upon reception of said multicast packet (P) a predefined subset of destinations (D4, D8); and next hop determining means (DES-HOP) coupled to said memory (MEM) to determine for said predefined subset of destinations (D4, D8) a next hop (R6) of said set of next hops (R6, R7) according to said value of said receiver update notification (RUN1) and according to said relation to said predefined construction set (CS1); and router inclusion means (R-INC) coupled between said next hop determining means (DET-HOP) and an output of said router (R3) to include in said multicast packet (P) said predefined subset of destinations (D4, D8) and said value of said receiver update notification (RUN1) and to forward said multicast packet (P) towards said next hop (R6), said predefined subset of destinations (D4, D8) including these destinations of said plurality of destinations for which said next hop (R6) is on a path to these destinations.

9. The router (R3) according to claim 7, characterized in that in the event of more than one next hop being included in said set of next hops (R6, R7), said predefined construction set (CS1) further includes a destination relation between said next hop (R6) and said predefined subset of destinations (D4, D8) and said destination determining means (DET-DES) is further included to determine said predefined subset of destinations (D4, D8) according to said destination relation.

10. An internet protocol to forward a multicast packet (P) with a connectionless multicast system, characterized in that said internet protocol system includes an ingress node (N1) according to claim 7.

11. An internet protocol according to claim 10, further comprising a router (R3), said router (R3) comprising:

memory means (MEM) coupled to an input of said router (R3) to store a relation between said value of said receiver update notification (RUN1) and said predefined construction set (CS1);

destination determining means (DET-DES) to determine upon reception of said multicast packet (P) said predefined subset of destinations (D4, D8);

next hop determining means (DES-HOP) coupled to said memory (MEM) to determine for said predefined subset of destinations (D4, D8) said next hop (R6) of said set of next hops (R6, R7) according to said value of said receiver update notification (RUN1) and according to said relation to said predefined construction set (CS1); and router inclusion means (R-INC) coupled between said next hop determining means (DET-HOP) and an output of said router (R3) to include in said multicast packet (P) said predefined subset of destinations (D4, D8) and said value of said receiver update notification (RUN1) and to forward said multicast packet (P) towards said next hop (R6).

12. An internet protocol according to claim 11, wherein in the event of more than one next hop being included in said set of next hops (R6, R7), said predefined construction set (CS1) further includes a destination relation between said next hop (R6) and said predefined subset of destinations (D4, D8) and said destination determining means (DET-DES) determines said predefined subset of destinations (D4, D8) according to said destination relation.

* * * * *